United States Patent
Scardato (10) Patent No.: US 9,851,593 B2
(45) Date of Patent: Dec. 26, 2017

(54) LCD FRAME ASSEMBLY

(71) Applicant: APPLE INC., Cupertino, CA (US)

(72) Inventor: Steven M. Scardato, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 842 days.

(21) Appl. No.: 13/890,914

(22) Filed: May 9, 2013

(65) Prior Publication Data

US 2014/0071377 A1  Mar. 13, 2014

Related U.S. Application Data

(60) Provisional application No. 61/699,778, filed on Sep. 11, 2012.

(51) Int. Cl.
| | | |
|---|---|---|
| *G02F 1/1333* | (2006.01) | |
| *G02F 1/13* | (2006.01) | |
| *F21V 8/00* | (2006.01) | |

(52) U.S. Cl.
CPC ..... *G02F 1/133308* (2013.01); *G02B 6/0088* (2013.01); *G02F 1/1303* (2013.01)

(58) Field of Classification Search
CPC ............. G02F 1/133308; G02F 1/1303; G02B 6/0088
USPC ...................................................... 349/58–65
See application file for complete search history.

(56) References Cited

U.S. PATENT DOCUMENTS

| | | | |
|---|---|---|---|
| 5,838,412 A * | 11/1998 | Ueda ................... | G02B 6/0088 349/150 |
| 6,814,458 B2 | 11/2004 | Kim et al. | |
| 7,920,222 B2 | 4/2011 | Chen et al. | |
| 8,253,875 B2 | 8/2012 | Kim | |
| 8,896,996 B2 * | 11/2014 | Sakamoto ......... | G02F 1/133308 349/58 |
| 2004/0190308 A1 * | 9/2004 | Chang ................. | G02B 6/0086 362/561 |
| 2005/0073626 A1 * | 4/2005 | Yeom ................ | G02F 1/133308 349/64 |
| 2007/0046859 A1 | 3/2007 | Huang et al. | |
| 2008/0143918 A1 * | 6/2008 | Kim ................. | G02F 1/133608 349/58 |
| 2008/0151138 A1 * | 6/2008 | Tanaka .............. | G02F 1/133308 349/58 |
| 2009/0091681 A1 * | 4/2009 | Nishizawa ........ | G02F 1/133308 349/58 |
| 2010/0065847 A1 * | 3/2010 | Gotou ............... | H01L 23/53219 257/59 |

(Continued)

*Primary Examiner* — Charles Chang (74) *Attorney, Agent, or Firm* — Fletcher Yoder PC (57) ABSTRACT

Systems, devices, and methods are provided for rear assembly of a display with a frame assembly having a frame joined to a liquid crystal layer (e.g., cell), initially forming a front of the display. The frame may be substantially continuous with the cell and formed without an adhesive layer, reducing a thickness of the display. The frame may be injection molded about the cell with a thermoplastic or thermoset material. Molding the frame about the cell may enable the frame to uniformly support the cell and/or support the cell with less material or structure. Various layers may be added to the frame assembly from a rear of the display. Rear assembly may further reduce the thickness of the display by removing one or more adhesive layers.

20 Claims, 5 Drawing Sheets

(56) References Cited

U.S. PATENT DOCUMENTS

| | | | |
|---|---|---|---|
| 2010/0097746 A1* | 4/2010 | Toyoda | G02F 1/133308 361/679.01 |
| 2010/0123850 A1* | 5/2010 | Miyashita | G02F 1/133308 349/58 |
| 2010/0171898 A1* | 7/2010 | Lee | G02F 1/133308 349/58 |
| 2011/0199549 A1* | 8/2011 | Washizawa | G02B 5/201 349/15 |
| 2011/0261282 A1* | 10/2011 | Jean | G02F 1/133308 349/58 |
| 2011/0261283 A1* | 10/2011 | Kim | H04N 5/2257 349/58 |
| 2012/0194760 A1 | 8/2012 | Fukuda | |
| 2013/0021295 A1* | 1/2013 | Kimura | G02F 1/13338 345/174 |
| 2013/0100372 A1* | 4/2013 | Wu | G02B 6/0088 349/58 |
| 2014/0055710 A1* | 2/2014 | Yu | G02F 1/133608 349/58 |

* cited by examiner

LCD FRAME ASSEMBLY

CROSS REFERENCE TO RELATED APPLICATIONS

This application claims the benefit of U.S. Provisional Patent Application No. 61/699,778, entitled "LCD Frame Assembly," filed Sep. 11, 2012, which is incorporated by reference herein in its entirety.

BACKGROUND

The present disclosure relates generally to a liquid crystal display (LCD) frame assembly for an electronic display and, more particularly, to methods for securing a display cell to a frame.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays, such as liquid crystal displays (LCDs), commonly appear in many different electronic devices, such as televisions, computers, and phones. LCDs portray images by modulating the amount of light that passes through a liquid crystal layer, or cell, within pixels of varying color. The cell may include a thin-film transistor layer and a color filter layer. A display driver for the LCD produces images on the display by adjusting the image signal supplied to each pixel across the display. The brightness of an LCD depends on the amount of light provided by a light source within a backlight assembly. As the backlight assembly provides more light, the brightness of the LCD increases. Optical layers (e.g., reflectors, polarizers) of the backlight assembly may affect qualities of the light through the cell.

A frame may support the cell and protect at least part of the cell and backlight assembly. In certain displays, a frame coupled to the backlight assembly and optical layers may be subsequently joined to the cell. Unfortunately, gaps between the frame and the cell due to the assembly method and manufacturing tolerances may increase the bulk of the display. Additionally, image data may not be displayed over gaps, reducing an active area of the display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, devices, and methods for rear assembly of a display with a frame assembly having a frame joined to a liquid crystal layer (e.g., cell). The frame may be assembled directly about the cell, initially forming the front of the display. The frame may be substantially continuous and seamless with the cell, reducing the occurrence of defects on the front of the display, and reducing gaps between the cell and the frame. The frame may be directly assembled about the cell without an adhesive layer, reducing the thickness of the display. In one example, the frame may be injection molded about the cell with a thermoplastic or thermoset material. Molding the frame about the cell may enable the frame to more uniformly support the cell and/or support the cell with less material or structure than conventional frames. Various layers may be added to the frame assembly from the rear of the display. For example, a backlight assembly may be assembled (e.g., layered) on the rear of the cell or inserted from the rear as an assembled backlight assembly. Some layers of the backlight assembly may distribute and guide light through the cell to illuminate images on the display. Rear assembly may further reduce the thickness of the display by removing one or more adhesive layers between the backlight assembly and the cell.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an example," or the like, are not intended to be interpreted as excluding the existence of additional embodiments that also incorporate the recited features.

As mentioned above, embodiments of the present disclosure relate to a display having a frame joined to a liquid crystal layer (e.g., cell) into a frame assembly. In some embodiments, the cell includes a thin-film transistor layer, a color filter layer, and polarizing filters. The frame assembly may be subsequently joined with additional components of the display, such as a light guide plate, one or more light sources, optical sheets, and reflector films. A front portion of the frame may be joined to the cell, initially forming a front of the display. The cell and frame may be joined without an adhesive layer. In some embodiments, the frame may be integrally molded about the cell, such as by injection molding. The frame material may be a thermoset material that cures due to exposure to relatively high temperatures, exposure to another material, or radiation (e.g., ultraviolet radiation, ionizing radiation, X-ray radiation). In some embodiments, the frame may be assembled around the cell, reducing a border area of the frame relative to the cell. For example, the frame may be formed with primary tolerances based on the dimensions of the cell, the first joined component of the display, rather than with primary tolerances based on the dimensions of the backlight assembly. The additional components of the display may be inserted within the frame assembly through a rear portion of the frame. In some embodiments, one or more optical sheets of the backlight assembly may be positioned adjacent to the cell without an adhesive layer, thereby reducing the thickness of the display.

Figure 1:
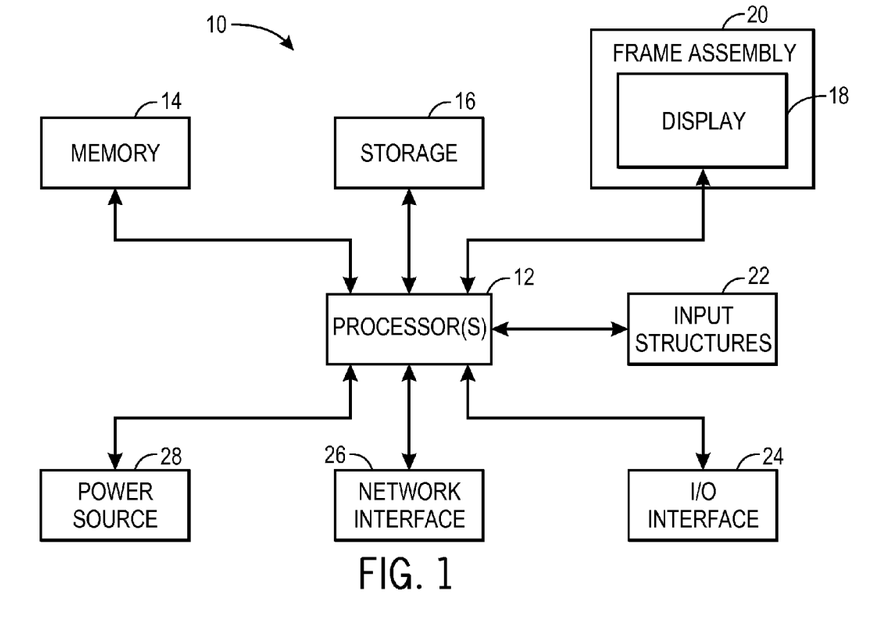
FIG. 1 is a schematic block diagram of an electronic device that incorporates a display within a frame assembly, in accordance with an embodiment.
Figure 2:
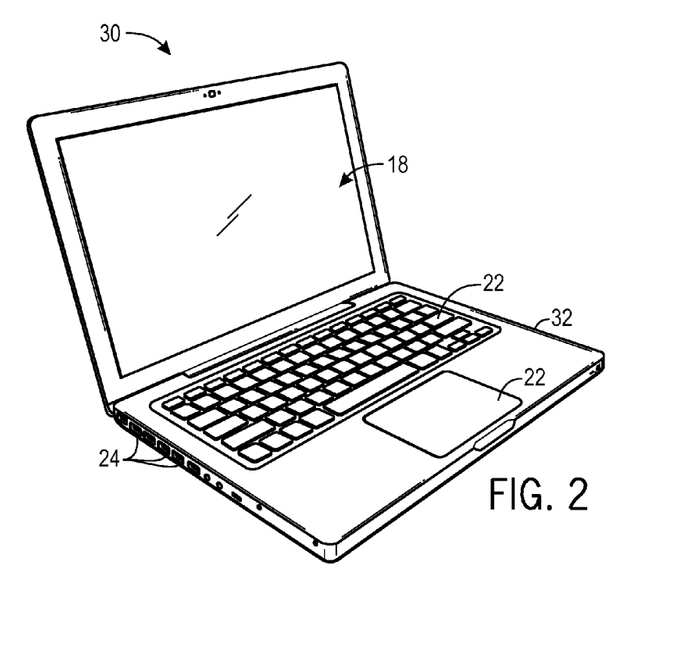
FIG. 2 is a perspective view of an example of the electronic device of FIG. 1 in the form of a notebook computer, in accordance with an embodiment.
Figure 3:
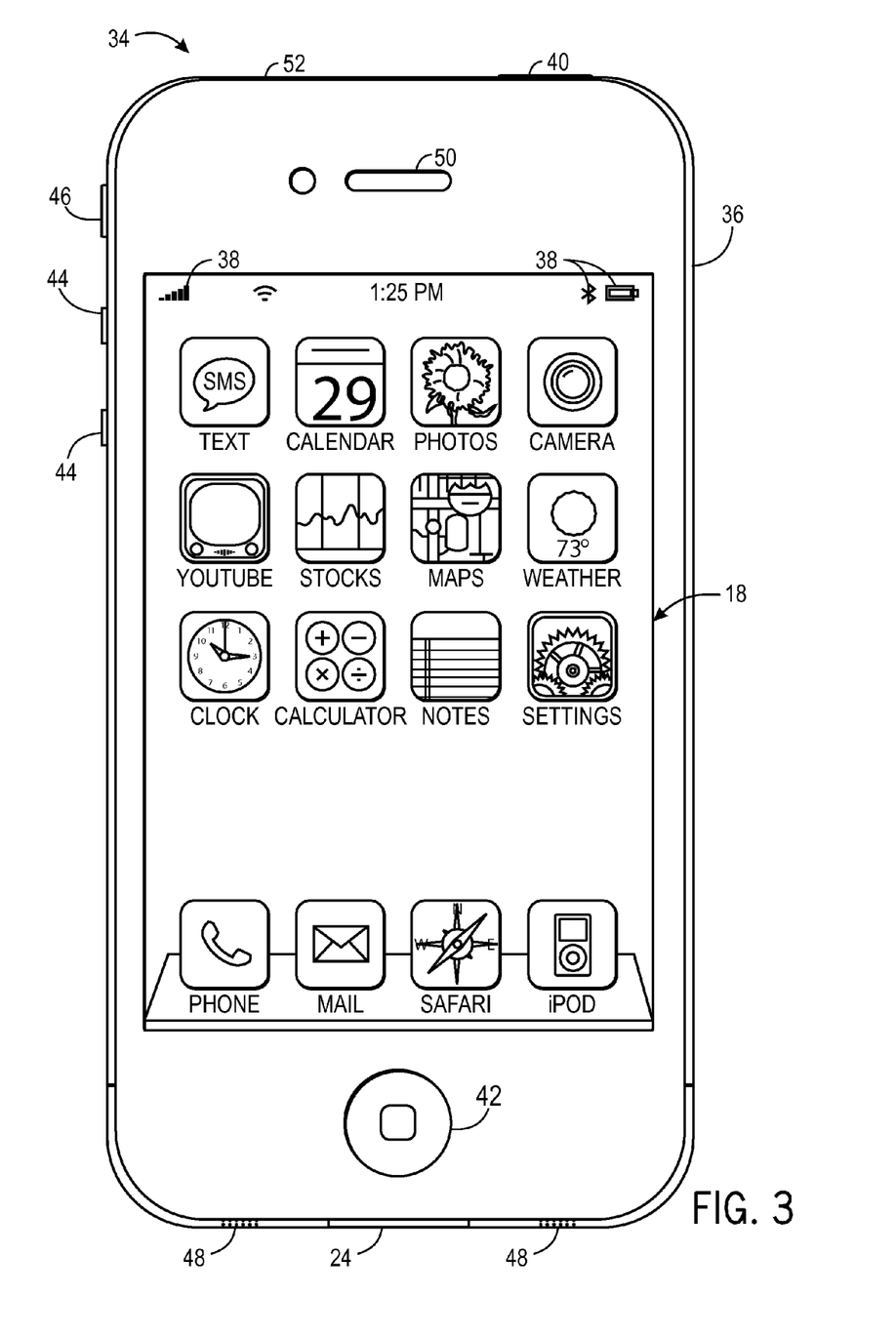
FIG. 3 is a front view of an example of the electronic device of FIG. 1 in the form of a handheld electronic device, in accordance with an embodiment.

With the foregoing in mind, a general description of suitable electronic devices that may employ electronic displays with the frame assembly will be provided below. In particular, FIG. 1 is a block diagram depicting various components that may be present in an electronic device suitable for use with such a display. FIGS. 2 and 3 illustrate various examples of suitable electronic devices in the form of a notebook computer and a handheld electronic device, respectively.

Turning first to FIG. 1, an electronic device 10 according to an embodiment of the present disclosure may include, among other things, one or more processor(s) 12, memory 14, nonvolatile storage 16, a display 18 and a frame assembly 20, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

By way of example, the electronic device 10 may represent a block diagram of the notebook computer depicted in FIG. 2, the handheld device depicted in FIG. 3, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile storage 16 to execute instructions to carry out various functions of the electronic device 10. Among other things, these functions may include generating image data to be displayed on the display 18. The programs or instructions executed by the processor(s) 12 may be stored in any suitable article of manufacture that includes one or more tangible, computer-readable media at least collectively storing the instructions or routines, such as the memory 14 and/or the nonvolatile storage 16. The memory 14 and the nonvolatile storage 16 may represent, for example, random-access memory, read-only memory, rewritable flash memory, hard drives, and optical discs. Also, programs (e.g., an operating system) encoded on such a computer program product may also include instructions that may be executed by the processor(s) 12 to enable other functions of the electronic device 10.

The display 18 may be a touch-screen liquid crystal display (LCD), for example, which may enable users to interact with a user interface of the electronic device 10. By way of example, the display 18 may be a MultiTouch™ display that can detect multiple touches at once. The processor 12 may show image data on the display 18 by adjusting pixels of a cell. The display 18 may include many layers, including the cell and backlight assembly (e.g., optical sheets, light guide, reflector) to guide light through the cell at a front of the display. The frame assembly 20 may include a frame coupled to the cell to form the front of the display 18. In some embodiments, light sources within the frame assembly 20 may illuminate the display 18 to increase the visibility of the image data shown by the display 18. The frame assembly 20 may be assembled about the cell to support and protect the display 18. Presently contemplated embodiments include methods of assembling the display 18 with the frame assembly 20 about the cell.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. In some embodiments, the frame assembly 20 may include at least a portion of the housing about the display 18. The input structures 22, such as a keyboard and/or touchpad, may be used to interact with the computer 30. Via the input structures 22, a user may start, control, or operate a GUI or applications running on computer 30.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. In some embodiments, the frame assembly 20 may include all or part of the enclosure 36. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may turn the display 18 on or off, the input structure 42 may navigate a user interface to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones.

Figure 4:
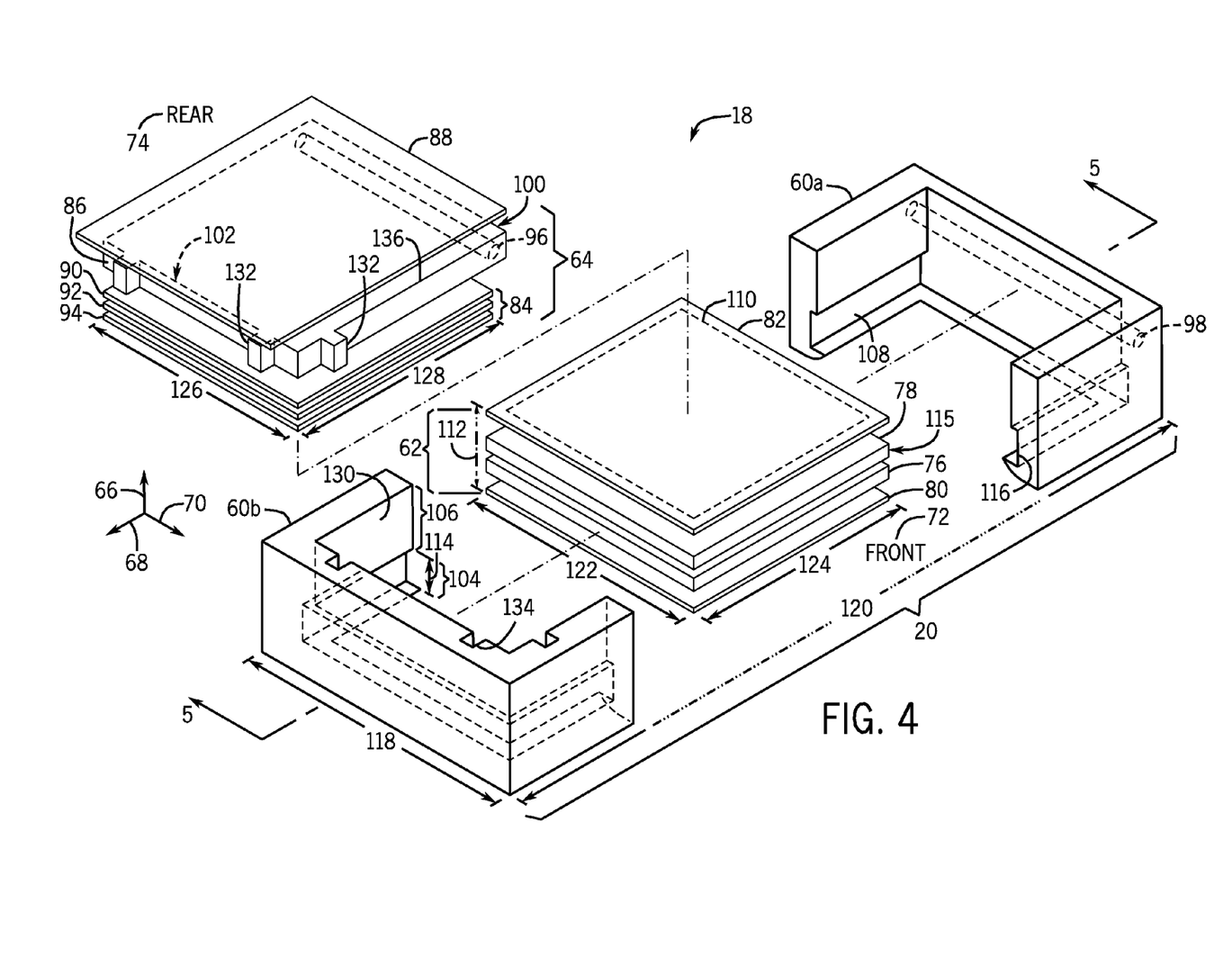
FIG. 4 is an exploded-view of the display of the electronic device, in accordance with an embodiment.

The display 18 and frame assembly 20 of an electronic device 10 are shown in the exploded-view of FIG. 4. When the display 18 is assembled, a frame 60 at least partially surrounds a cell 62 and a backlight assembly 64. For ease of explanation, the display 18 may be described in relation to a coordinate system along a Y-axis 66, an X-axis 68, and a Z-axis 70. Points lower along the Y-axis 66 toward a front 72 of the display 18 may be referred to as "beneath," "lower," "below," "in front of," and so forth. Points higher along the Y-axis 66 toward a rear 74 of the display 18 may be referred to as "above," "higher," "on top of," "behind," and so forth. FIG. 4 illustrates the frame 60 as a right half 60a and a left half 60b that may be joined together about the cell 62 along the X-axis 68. In some embodiments, the frame 60 may be a single component. Alternatively, the frame 60 may be assembled from more than two sections (e.g., 3, 4, 5, 6, 7, 8, 9, 10, or more).

Presently contemplated embodiments of the cell 62 may include a first glass plate 76 (e.g., color filter layer) in front of, or below, a second glass plate 78 (e.g., thin-film transistor layer). The cell 62 may include a front polarizer 80 and a rear polarizer 82 on opposing faces of the cell 62. The backlight assembly 64 may include optical sheets 84, a light guide plate 86, and a reflector film 88 (e.g., specular reflector or diffuse reflector). The optical sheets 84 may include a diffuser layer 90 and optical films 92, 94. The order of the optical sheets 84 along the Y-axis 66 may vary between embodiments. In some embodiments, the light guide plate 86 may be coupled with one or more light sources 96. Additionally or alternatively, one or more light sources 98 may be integrated with the frame 60. The one or more light sources 96, 98 may include a cold-cathode fluorescent lamp (CCFL), one or more light emitting diodes (LEDs), or any other suitable source of light. Light from the one or more light sources 96, 98 may pass through the light guide plate 86 from a first edge 100 to an opposing second edge 102. In one example, the light guide plate 86 may be formed from polymethyl-methacrylate, an acrylic glass commonly referred to as "PMMA." In some embodiments, the diffuser layer 90 may be formed from polyethylene terephthalate (PET). The reflector film 88 and light guide plate 86 may direct light through the backlight assembly 64 from the rear 74 towards the cell 62 at the front 72 of the display 18. The light guide plate 86 and diffuser layer 90 may scatter light over a very broad range of distribution through the cell 62.

The optical films 92, 94 may function to focus this very broad light towards the cell 62, thereby increasing the apparent brightness of the display 18. For instance, optical films 92, 94 may include brightness enhancement films that generally increase "on-axis" brightness (e.g., the brightness along the Y-axis 66). Brightness enhancement films may include prisms, lenses, or other features formed on a front surface of such films and directed toward or away from the light guide plate 86. The optical films 92, 94 may increase on-axis brightness by permitting certain received light to be emitted through the cell 62 within a desired viewing range about Y-axis 66, while the other received light may be recycled by reflecting towards the reflector film 88.

As may be appreciated, the rear polarizer 82 may polarize the light from the backlight assembly 64 in a first direction (e.g., along the X-axis 68). The front polarizer 80 may polarize the light from the first and second glass plates 76, 78 in a second perpendicular direction (e.g., along the Z-axis 70). The cell 62 may include numerous pixels that selectively modulate the amount and color of light passing from the backlight assembly 64 through the cell 62 by changing the polarization of the light. The cell 62 may employ any suitable liquid crystal display architecture, such as twisted nematic (TN), in-plane switching (IPS), fringe-field switching (FFS), and/or vertical alignment (e.g., multi-domain vertical alignment (MVA) or patterned vertical alignment (PVA))

A front portion 104 of the frame 60 may accommodate the cell 62, and a rear portion 106 of the frame may accommodate the backlight assembly 64. In some embodiments, the frame assembly 20 may be assembled by joining frame components (e.g., right half 60a, left half 60b) about the cell 62 along the X-axis 68 and/or Z-axis 70. For example the cell 62 may be positioned within a slot 108 adjacent to the front portion 104 of the frame 60 to form the frame assembly 20. The slot 108 may substantially surround a perimeter 110 of the cell 62. The assembled cell 62 may have a thickness 112 less than or approximately equal to the slot height 114. The cell 62 may be coupled with the frame 60 by an interference fit and/or an adhesive. The slot 108 may accommodate the cell 62 such that a slot face 116 is substantially in contact with an edge 115 of the cell 62 about the perimeter 110. The interface between the slot face 116 and the edges 115 of the cell 62 reduce or substantially eliminate gaps between the cell 62 and the frame 60. This interface of the frame 60 formed to fit the cell 62 first, then the backlight assembly 64 enables a smaller frame width 118 and smaller frame length 120 than a conventional frame that is formed to fit the backlight assembly first, then the cell. In some embodiments, a gasket or other seal within the slot 108 may interface with the cell 62 and secure the cell 62 within the slot 108. Directly assembling the frame 60 about the cell 62 before inserting the backlight assembly 64 may interface the cell 62 with the slot 108 and slot face 116 around substantially the whole perimeter 110 and edges 115. Direct assembly of the frame 60 about the cell 62 with the frame tolerances based on the dimensions of the cell 62 may enable the frame width 118 to be slightly larger than the cell width 122, and enable the frame length 120 to be slightly larger than the cell length 124. For example, the frame width 118 and frame length 120 may be less than approximately 0.3, 0.5, 1, or 2 mm larger than the respective cell width 122 and cell length 124. The dimensions of the frame 60 formed directly about the cell 62 may reduce a border area around the cell 62 and/or reduce gaps between the frame 60 and the cell 62, enabling image data to be displayed closer to the edge of the display 18.

In some embodiments, the frame assembly 20 may be assembled by inserting the cell 62 into an assembled frame 60. For example, the right half 60*a* and left half 60*b* may be joined together along the X-axis 68. Then the cell 62 may be inserted along the Y-axis 66 from the front 72 or rear 74 of the display 18 into the front portion 104. Alternatively, as discussed below with FIGS. 7 and 8, the frame 60 may be integrally formed (e.g., molded) about the cell 62. The integrally formed frame 60 may be substantially continuous with the cell 62, such that the interface between the frame 60 and the cell 62 is seamless.

The backlight assembly 64 may be inserted into the frame assembly 20 from the rear 74 of the display 18 due to the position of the cell 62 in the front portion 104. The rear portion 106 of the frame 60 may accommodate the backlight assembly 64 behind the cell 62. The backlight width 126 may be greater than or equal to the cell width 122, and the backlight length 128 may be greater than or equal to the cell length 124. In some embodiments, the optical sheets 84 may be positioned adjacent to the cell 62 (e.g., rear polarizer 82) and/or the front portion 104 of the frame 60. In some embodiments, an airgap may be present between the optical sheets 84 and the cell 62. In some embodiments, at least one of the optical sheets 84 may be arranged within the frame assembly 20 without an adhesive. One or more layers of the backlight assembly 64 may interface with the inner face 130 of the rear portion 106. For example, locating features 132 of the light guide plate 86 may interface with locating slots 134 of the frame 60 to control the assembled position of the light guide plate 86. The locating features 132 and mating locating slots 134 may be of any suitable geometry that enables the light guide plate 86 to be positioned at a desired position relative to the one or more light sources 96, 98 and the cell 62. The light guide plate 86 may be positioned within the frame assembly 20 to enable the light guide plate 86 at the desired position to direct sufficient and uniform light toward the cell 62 to produce illuminated images on the front 72 of the display 18. One or more locating features 132 may be arranged about the light guide plate 86, such as along the first edge 100, second edge 102, or a third edge 136.

Figure 5:
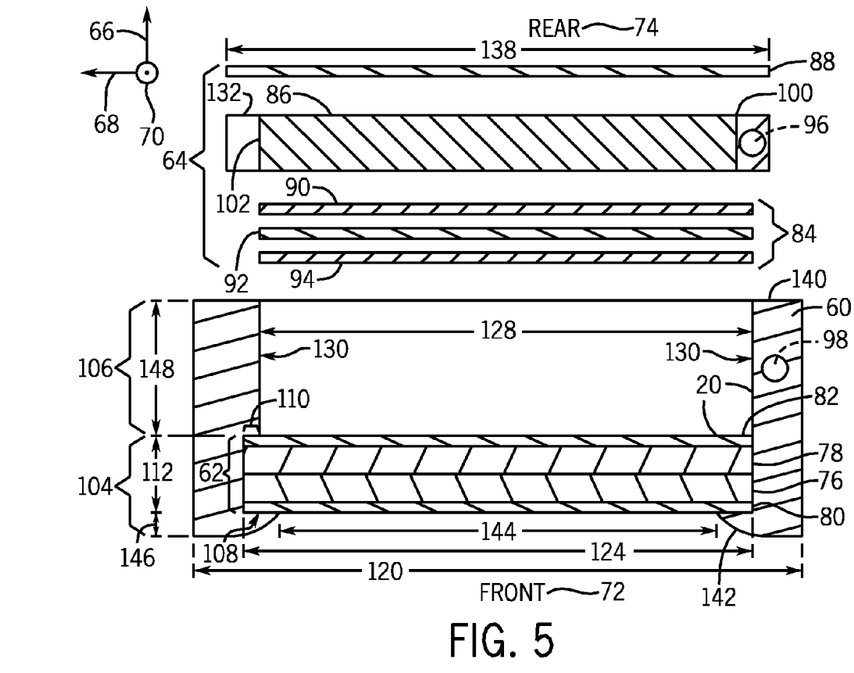
FIG. 5 is a cross-sectional view of an embodiment of the display of FIG. 4, taken along line 5-5, illustrating the frame assembly and a backlight assembly.

The cross-sectional view of FIG. 5 illustrates an embodiment of the display 18 taken along line 5-5 of FIG. 4. The frame 60 is shown joined with the cell 62, forming the frame assembly 20. The perimeter 110 of the cell 62 is substantially surrounded by the front portion 104 of the frame 60. The rear portion 106 of the frame 60 may accommodate the insertion of the backlight assembly 64 along the Y-axis 66 from the rear 74 of the display 18. The backlight assembly 64 may be inserted as a single backlight assembly unit, or inserted as multiple layers. For example, the optical sheets 84 may be layered first, the light guide plate 86 may be layered second, and the reflector film 88 may be layered third. The opposing inner faces 130 of the rear portion 106 may be spaced apart a distance greater than or approximately equal to the backlight length 128. In some embodiments, the reflector film 88 has a reflector length 138 greater than the backlight length 128. The reflector film 88 may be positioned behind the rear face 140 of the frame 60.

The frame 60 may extend over at least a portion (e.g., perimeter 110) of the cell 62. The frame 60 may protect the perimeter 110 of the cell from environmental conditions (e.g., dust, moisture, EMI, etc.) and from mechanical forces that may otherwise chip, crack, or damage the cell 62. In some embodiments, the frame 60 is assembled about the cell 62 to be substantially seamless due to the dimensions of the frame 60 relative to the dimensions of the cell 62. The dimensions of the frame may reduce gaps between the frame 60 and the cell 62 to substantially block particulates from entering the frame assembly 20. Particulates that may otherwise pass into the display of a conventional frame assembly may cause observable defects on the screen, such as to interfere with light transmission and/or reflection. Lips 142 at the front 72 of the frame 60 may at least partially support the cell 62 along the Y-axis 66. In some embodiments, an active area of the cell 62 between the lips 142 may have an active length 144 that is less than the cell length 124. Similarly, the active area between the lips 142 may have an active width along the Z-axis 70 that is less than the cell width 122. In some embodiments, the active length 144 may be approximately 0.1, 0.2, 0.5, 1, or 2 mm shorter than the cell length 124. This may reduce a border area about the cell 62, thereby decreasing a ratio between the area of the electronic device 10 (e.g., frame width 118 by frame length 120) and an active area of the cell 62 (e.g., active width by active length 144). The lips 142 may extend a lip distance 146 along the Y-axis 66 toward the front 72 of the display 18. In some embodiments, the lip distance 146 may be less than approximately 0.1, 0.2, or 0.5 mm. The lips 142 may at least partially protect the front of the display 18. The lips 142 may enable a substantially continuous interface between the cell 62 and the frame 60 that reduces the appearance of observable defects on the front 72 of the display 18. The continuous interface may be without gaps (e.g., seamless) to prevent particulates from entering the display 18. For example, a frame 60 may be integrally molded about the cell 62 to form a substantially seamless interface. The lips 142 may at least partially enclose the cell 62 to reduce any gaps between the cell 62 and the frame 60.

The optical sheets 84 may be positioned (e.g., layered) through the rear 74 of the display 18 to be adjacent to the cell 62 of the frame assembly 20. Adhesive layers may be used to maintain the position of some of the layers of the backlight assembly 64 within the frame assembly 20. Each adhesive layer may be between approximately 0.05 to 0.2 mm. However, in some embodiments, at least one optical sheet 84 may be positioned without an adhesive layer, enabling a thinner display. For example, the optical film 94 may be positioned adjacent to the cell 62 without an adhesive layer. A normal force from the backlight assembly 64 may maintain the position of the optical film 94 without the adhesive layer. In some embodiments, the optical sheets 84 may be positioned in front of the light source 98 disposed within the frame 60.

The light guide plate 86 may be positioned above along the Y-axis 66, or on top of the optical sheets 84. In some embodiments, the light guide plate 86 may be coupled with a light source 96, such that the light source 96 may be inserted from the rear 74 of the display 18 into the frame assembly 20 with the light guide plate 86. The light source 96 may be a part of a locating feature 132 used to position the light guide plate 86 relative to the cell 62 of the frame assembly 60. In some embodiments, the light guide plate 86 may be positioned adjacent to the light source 98 disposed within the frame 60. The light guide plate 86 may receive light primarily along the X-axis 68 from the light source 96, 98, and direct the light along the Y-axis 66 towards the front 72 of the display 18. The reflector film 88 may be a diffuse reflector or a specular reflector that may increase the light directed through the cell 62. Some examples of specular reflectors include a silver reflector film or an enhanced spectral reflector (ESR) film, including a model of Vikuiti® ESR film, available from 3M Company. In some embodiments, the thickness of the backlight assembly 64 is less than a frame depth 148 of the rear portion 106. Alternatively, the thickness of the backlight assembly 64 may be greater than the frame depth 148. The reflector film 88 may be disposed within the frame 60 or on the rear face 140.

Figure 6:
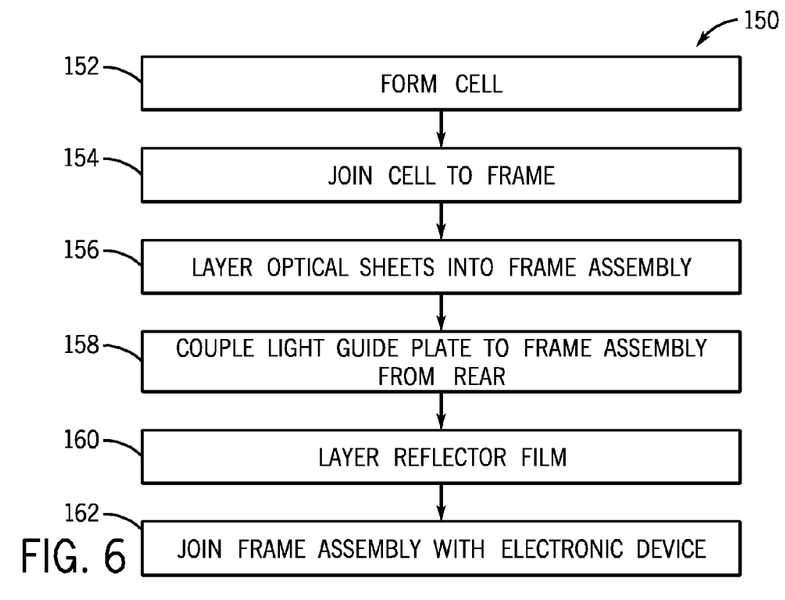
FIG. 6 is a flowchart of a method for manufacturing the electronic display in accordance with an embodiment.

The electronic display 18 shown in FIGS. 4 and 5 may be manufactured according to a flowchart 150 of FIG. 6. The flowchart 150 illustrates a rear assembly method of assembling a display 18. Specifically, the cell 62 may be formed (block 152) by combining the first glass plate 76 (e.g., color filter) with the second glass plate 78 (e.g., thin-film transistor). The formed cell 62 may include a front polarizer 80 and a rear polarizer 82 on opposing faces of the cell 62 as described above. The cell 62 may be joined (block 154) to the frame 60. The frame 60 may be formed from one or more components or sections that are assembled about the cell 62. In some embodiments, the cell 62 may be inserted through the front 72 or the rear 74 of the display 18. The cell 62 may be joined (block 154) with the frame 60 without adhesives, such as by an interference fit or geometrical constraint (e.g., the cell 62 arranged within the slot 108 adjacent to the slot face 116). Moreover, as described below with FIGS. 7 and 8, the frame 60 may be molded about the cell 62, such as by injection molding. Initially, the frame 60 may be joined (block 154) to the cell 62 to reduce gaps and/or to form a substantially seamless interface between the frame 60 and the cell 62.

Optical sheets 84 of the backlight assembly 64 may be layered (block 156) into the frame assembly 20 from the rear 74 after the cell 62 has been joined (block 154) to the frame 60. As discussed above, the optical sheets 84 may include a diffuser layer 90 and optical films 92, 94. One or more of the optical sheets 84 may be layered (block 156) into the frame assembly 20 without an adhesive layer. Upon positioning of the optical sheets 84, the light guide plate 86 may be coupled (block 158) to the frame assembly 20 from the rear 74 of the display 18. In some embodiments, the light guide plate 86 may be coupled to the frame assembly 20 with a light source 96. Alternatively, a light source 98 may be disposed within the frame 60, and the light guide plate 86 may be coupled (block 158) adjacent to the light source 98 to direct light towards the cell 62 at the front 72 of the display 18. In some embodiments, locating features 132 of the light guide plate 86 may interface with locating slots 134 of the frame 60 to arrange the light guide plate 86 in a desired position. A reflector film 88 may be layered (block 160) on top of the light guide plate 86 to reflect light from the light source 96, 98 towards the cell 62. In some embodiments, the reflector film 88 and/or light guide plate 86 may substantially seal the rear 74 of the display 18. The frame assembly 20 may be joined (block 162) with the electronic device 10. In some embodiments, the frame assembly 20 may form at least a portion of the housing 32 or enclosure 36 about the display 18 of the electronic device 10.

Figure 7:
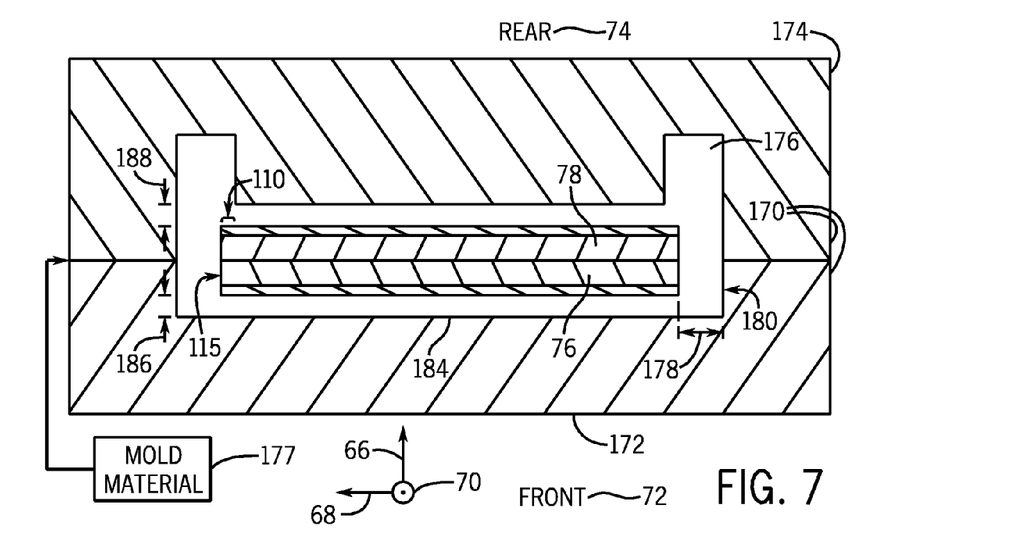
FIG. 7 is a side view of an embodiment of a cell within a frame assembly mold, in accordance with an embodiment.

In some embodiments, the frame 60 may be assembled about the cell 62 with components (e.g., right half 60a, left half 60b) as shown in FIG. 4 above. In some embodiments, the frame 60 may be integrally formed (e.g., injection molded) about the cell 62. FIG. 7 illustrates a cross-section of the cell 62 disposed within a mold 170 (e.g., front mold 172 and rear mold 174) that may be used to form the frame about the cell 62. The front mold 172 and the rear mold 174 may form a void 176 to receive the cell 62 and a mold material 177. In some embodiments, the mold 170 may be steel or other suitable material. The mold material 177 may be inserted into the void 176 and interface directly with the cell 62 to form the frame 60. In some embodiments, the mold material 177 may substantially encapsulate the cell 62. In some embodiments, the mold material 177 may form a substantially seamless interface with the perimeter 110 of the cell 62 and surround the edges 115. The mold material 177 may be one or more natural or synthetic materials, including but not limited to thermoplastics, thermoset plastics, rubbers, epoxies, or other materials. Examples of molding processes to form the frame 60 may include injection molding, compression molding, or transfer molding. The mold material 177 within the void 176 may form the front portion 104 about the cell 62 and the rear portion 106 to accommodate the backlight assembly 64. In some embodiments, the void 176 may be substantially the inverse shape of the frame 60 illustrated in FIGS. 4 and 5.

In some embodiments, the mold material 177 may enter the void 176 in a substantially fluid state. The mold material 177 may cure to a substantially solid state upon cooling, duration of time, and/or exposure to radiation. For example, a thermoplastic mold material 177 may cure to a substantially solid frame 60 upon cooling to approximately room temperature or operating temperature of the electronic device. A thermoset mold material 177 may cure to a substantially solid state upon cooling and/or exposure to radiation (e.g., ultraviolet, ionizing, X-ray). In some embodiments, the mold material 177 is an epoxy that cures to a substantially solid state upon mixing of the two or more epoxy materials.

The cell 62 may be spaced a distance 178 from the mold wall 180 about the edge 115 of the cell 62. In some embodiments, the distance 178 may be less than approximately 0.3, 0.5, 1, or 2 mm. A front face 184 of the front mold 172 may be spaced a front distance 186 from the cell 62 along the Y-axis 66. In some embodiments, the front distance 186 may be less than approximately 0.1, 0.2, or 0.5 mm. The void 176 of the front mold 172 may form the lips 142 described above with FIG. 5. The rear portion 106 of the frame 60 may be formed within the rear mold 174 proximate to the perimeter 110 of the cell 62. The rear mold 174 may be spaced a rear distance 188 from the cell 62 along the Y-axis 66. The rear distance 188 may be less than approximately 0.5, 1, 2, or 3 mm. The backlight assembly 64 may be joined as a single unit or layered separately through the rear 74 of the display 18 after the frame assembly 20 has been formed.

Figure 8:
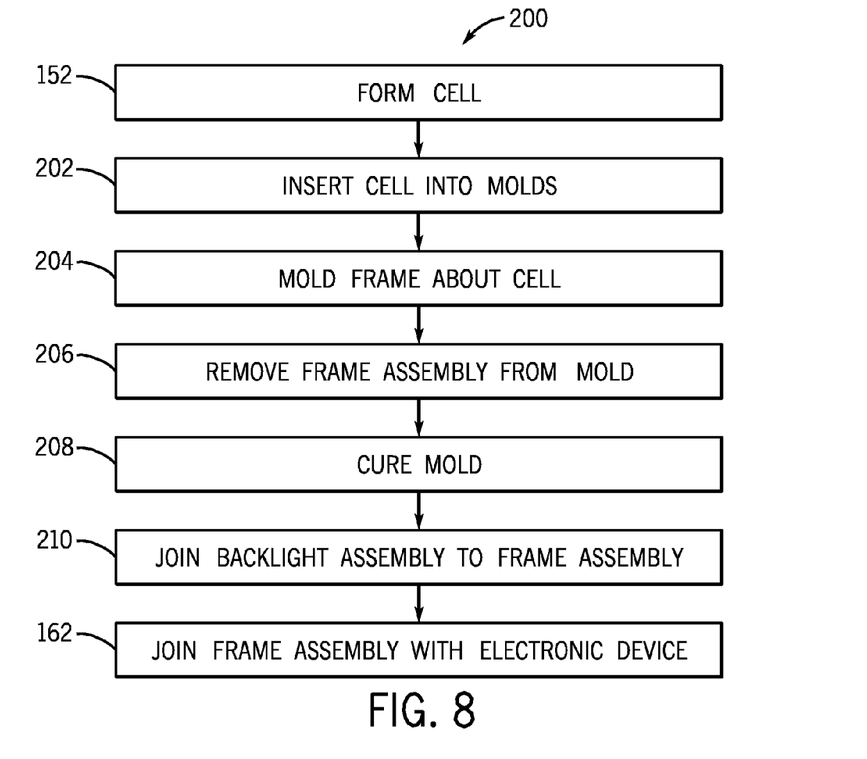
FIG. 8 is a flowchart of a method for manufacturing the electronic display in accordance with an embodiment.

The electronic display 18 shown in FIGS. 4 and 5 may be manufactured according to a flowchart 200 of FIG. 8. The flowchart 200 illustrates a rear assembly method of assembling a display 18 by molding the frame 60 about the cell 62. Specifically, the cell 62 may be formed (block 152) by combining the first glass plate 76 (e.g., color filter) with the second glass plate 78 (e.g., thin-film transistor). The formed cell 62 may include a front polarizer 80 and a rear polarizer 82 on opposing sides of the cell 62 as described above. The cell 62 may be inserted (block 202) into the mold 170. Voids within the mold 170 may accommodate the cell 62 and form substantially the inverse shape of the frame 60. The frame 60 may be molded (block 204) about the cell 62 by inserting the mold material 177 into the mold 170 via a suitable molding process. As discussed above, the molding process may include injection molding, compression molding, or transfer molding.

The molded frame 60 may be integrally formed about the cell 62. For example, the frame 60 may interface directly with the cell 62 about the perimeter 110. The integrally formed frame 60 may protect the edges 115 of the cell 62. Molding (block 204) the frame 60 about the cell 62 may substantially reduce or eliminate gaps between the cell 62 and the frame 60 so that the frame 60 is substantially seamless with the cell 62. The frame 60 may provide the cell 62 with substantially uniform support along the Y-axis 66 across the cell 62. Molding (block 204) the frame 60 may enable the frame 60 to be joined with the cell 62 without an adhesive layer, thereby reducing the thickness of the display 18 along the Y-axis 66.

The molded frame assembly 20 may be removed (block 206) form the mold 170. In some embodiments, flash (e.g., excess mold material 177) may be removed from the frame assembly 20. Portions of the mold material 177 may be machined from the frame assembly 20 to accommodate further assembly. The molded frame assembly 20 may be cured (block 208) by cooling, exposure to radiation, and/or intermixing of the mold material 177 to substantially solidify the frame 60 about the cell 62. In some embodiments, the molded frame assembly 20 may be cured prior to removal (block 206) from the mold 170. The backlight assembly 64 may be joined (block 210) to the frame assembly 20 from the rear 74 of the display 18 similar to blocks 156, 158, and 160 described above in flowchart 150 of FIG. 6. The frame assembly 20 may be joined (block 162) with the electronic device 10. In some embodiments, the frame assembly 20 may form at least a portion of the housing 32 or enclosure 36 about the display 18 of the electronic device 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for manufacturing an electronic display, comprising:
    forming a frame about a cell, wherein the cell comprises a thin-film transistor layer, a color filter layer, a front surface, and a rear surface, wherein the frame forms a substantially seamless interface with the front surface of the cell, wherein forming the frame about the cell comprises interfacing the frame and the cell without an adhesive layer between the frame and the front surface of the cell or between the frame and the rear surface of the cell;
    layering a backlight assembly within the frame from a rear of the electronic display, wherein the backlight assembly comprises an optical sheet; and
    interfacing the optical sheet of the backlight assembly with the rear surface of the cell without an airgap between the optical sheet and the thin-film transistor layer of the cell, wherein the optical sheet is layered adjacent to the rear surface of the cell.

2. The method of claim 1, comprising forming the cell, wherein forming the cell comprises layering a front polarizer, the color filter layer, the thin-film transistor layer, and a rear polarizer.

3. The method of claim 1, wherein the frame comprises a first half and a second half coupled about the cell.

4. The method of claim 1, wherein the backlight assembly comprises a plurality of optical sheets, and layering the backlight assembly within the frame comprises layering the plurality of optical sheets over the rear surface of the cell.

5. The method of claim 1, comprising forming the backlight assembly, wherein forming the backlight assembly comprises layering the optical sheet, a light guide plate, and a reflector film, wherein layering the backlight assembly within the frame comprises layering the formed backlight assembly.

6. The method of claim 1, wherein the backlight assembly comprises a light guide plate with one or more locating features extending from an edge of the light guide plate, and the frame comprises one or more locating slots configured to accommodate the one or more locating features and a light source, wherein layering the backlight assembly comprises fitting the one or more locating features into the one or more locating slots to position the light guide plate in a desired position relative to the light source.

7. A method for manufacturing a liquid crystal display (LCD), comprising:
    coupling a liquid crystal layer to a front portion of a frame to form a frame assembly, wherein a cell width in a plan view of the liquid crystal layer is less than approximately 2 mm smaller than a frame width in the plan view of the frame assembly, and a cell length in the plan view of the liquid crystal layer is less than approximately 2 mm smaller than a frame length in the plan view of the frame assembly; and
    coupling a backlight assembly to a rear portion of the frame, wherein the backlight assembly is coupled to the frame from a rear direction after coupling the liquid crystal layer to the frame.

8. The method of claim 7, wherein coupling the liquid crystal layer to the front portion comprises interfacing a substantial portion of a perimeter of the liquid crystal layer with the front portion.

9. The method of claim 7, wherein the front portion comprises a lip, wherein coupling the liquid crystal layer to the front portion forms a substantially seamless interface between the lip and the liquid crystal layer.

10. The method of claim 7, comprising inserting a light source within the rear portion of the frame.

11. The method of claim 7, wherein coupling the backlight assembly to the rear portion of the frame comprises disposing the backlight assembly adjacent to the liquid crystal layer.

12. The method of claim 11, wherein the backlight assembly comprises one or more optical sheets and a light guide, wherein coupling the backlight assembly to the rear portion of the frame comprises layering the one or more optical sheets adjacent to the liquid crystal layer without an adhesive layer on the liquid crystal layer.

13. The method of claim 12, comprising disposing a reflector film on a rear face of the frame after coupling the backlight assembly to the rear portion of the frame.

14. A rear assembly electronic display comprising:
a cell comprising a thin-film transistor layer and a color filter layer, wherein the cell comprises a front surface, a rear surface, and edges between the front surface and the rear surface, wherein the front surface and the rear surface comprise a perimeter spaced apart from the edges of the cell, the front surface comprises a front polarizer, and the rear surface comprises a rear polarizer that interfaces with the thin-film transistor layer;
a frame comprising a front portion and a rear portion, wherein the front portion comprises a slot configured to substantially surround the edges of the cell, to interface with the perimeter on the front surface and the rear surface, and to retain the cell without an adhesive layer, and the rear portion is configured to receive a backlight assembly through a rear face; and
the backlight assembly disposed adjacent to the rear surface of the cell, wherein the backlight assembly comprises one or more optical sheets, and an optical sheet of the one or more optical sheets interfaces with the rear polarizer without an adhesive layer.

15. The electronic display of claim 14, wherein the front portion comprises a lip, and the lip and the cell are configured to form a substantially seamless interface on a front of the electronic display.

16. The electronic display of claim 15, wherein the lip extends less than approximately 0.5 mm from the cell toward the front of the electronic display.

17. The electronic display of claim 14, comprising a light source disposed in the rear portion of the frame adjacent to the light guide plate or disposed in the backlight assembly.

18. The electronic display of claim 14, wherein the light guide plate comprises one or more locating features extending from a light guide plate edge, and the rear portion of the frame comprises one or more locator slots configured to receive the respective one or more locating features and to position the backlight assembly relative to the cell.

19. An electronic device, comprising:
one or more input structures;
a storage structure encoding one or more executable routines;
a processor capable of receiving inputs from the one or more input structures and of executing the one or more executable routines when loaded in the storage structure; and
a rear assembly display device configured to display an output of the processor, wherein the rear assembly display device comprises:
a cell comprising a thin-film transistor layer, a color filter layer, a front surface, and a rear surface;
a frame comprising a front portion, a rear portion, and a rear face, wherein the front portion is disposed about the cell and is configured to form a substantially seamless interface with the front surface of the cell; and
a backlight assembly comprising an optical sheet, a light guide plate, and a reflector film, wherein the optical sheet interfaces with the rear surface of the cell without an airgap between the optical sheet and the thin-film transistor layer of the cell;
wherein the cell does not interface with an adhesive layer between the frame and the cell or between the optical sheet and the cell.

20. The electronic device of claim 19, wherein the electronic device comprises a desktop computer, a laptop computer, a tablet computer, a media player, a portable phone, a personal data organizer, or a handheld game platform, or any combination thereof.

* * * * *